United States Patent [19]
Crompton et al.

[11] Patent Number: 6,162,856
[45] Date of Patent: *Dec. 19, 2000

[54] REFLECTIVE COMPOSITION OF PARTICLES WITH RESINOUS BINDER AND PROCESS FOR PREPARING SAME

[75] Inventors: Thomas J. Crompton, Centerville; Walter J. Blatter, Woodbury; Kevin P. Poblocki, Apple Valley, all of Minn.

[73] Assignee: H.B. Fuller Licensing & Financing, St. Paul, Minn.

[ * ] Notice: This patent is subject to a terminal disclaimer.

[21] Appl. No.: 09/287,299

[22] Filed: Apr. 7, 1999

Related U.S. Application Data

[63] Continuation-in-part of application No. 08/946,507, Oct. 7, 1997.

[51] Int. Cl.⁷ .............................. C08J 5/10; C08K 3/08; C08L 31/06
[52] U.S. Cl. ............................ 524/441; 524/439; 524/440
[58] Field of Search .................................. 524/439, 440, 524/441; 523/172; 428/407

[56] References Cited

U.S. PATENT DOCUMENTS

| | | | |
|---|---|---|---|
| 5,045,114 | 9/1991 | Bigalk et al. | 106/404 |
| 5,187,220 | 2/1993 | Richart et al. | 524/441 |

FOREIGN PATENT DOCUMENTS 4404556   10/1973   United Kingdom .

*Primary Examiner*—James J. Seidlock
*Assistant Examiner*—U. K. Rajguru
*Attorney, Agent, or Firm*—Nancy N. Quan

[57] ABSTRACT

A powder coating, and a method for manufacturing a powder coating that includes high-shear mixing of powdered binder and powdered pigment while controlling the temperature of the mixture within the range between the softening temperature and the glass transition temperature of the binder or first below the glass transition temperature and then above the glass transition temperature of the binder.

11 Claims, No Drawings

6,162,856

REFLECTIVE COMPOSITION OF PARTICLES WITH RESINOUS BINDER AND PROCESS FOR PREPARING SAME

CROSS REFERENCE TO RELATED APPLICATIONS

This application is a Continuation In Part of related U.S. application Ser. No. 08/946,507, filed Oct. 7, 1997, pending, titled REFLECTIVE COMPOSITION OF PARTICLES WITH RESINOUS BINDER AND PROCESS FOR PREPARING SAME, which application is hereby incorporated by reference.

BACKGROUND OF THE INVENTION

FIELD OF THE INVENTION

The present invention relates to powder coating technology that can be used to produce hard, uniform coatings through the heat curing of a powder uniformly applied to a surface. In particular, it relates to the production of a coating composition and to its application to a surface, which coating composition, after heating, forms a shiny, reflective metallic appearance. The preferred powder coating is based on aluminum flakes and a thermosetting polymer resin.

Bright, shiny, metallic finishes are desirable in many commercial applications. The major source of these shiny finishes is chemical or electrical plating of metals such as chrome. However, chemical coating processes such as chrome treatments have environmental and economic drawbacks. Chromium is a major source of heavy metal contamination and is expensive to produce. With this in mind, a great deal of attention has been given to producing shiny coatings with powder compositions. Powder coatings are generally produced by mixing a binder with other constituents which can be melt mixed, cooled, and pulverized to provide a powder material that is easily applied to a conductive surface. The powder or surface is then heated to cause the powder coating composition to melt and flow to form a continuous coating.

Powder coating compositions are most commonly applied through electrostatic spray coating or fluidized bed coating. In the electrostatic spray process, the coating composition is dispersed in an air stream before being subjected to a high voltage field in which the particles acquire an electrostatic charge. The charged particles are attracted to a grounded or charged substrate. The coated substrate is then heated to a temperature sufficient to melt the powder coating and to cause it to flow, providing a smooth even finish.

Fluidized bed coating makes it possible to apply films as thick as about 2.5 mm. In this method, the powder coating composition is fluidized in a fluidized bed by passing a fluidizing gas stream into a vessel containing the powder coating. A substrate is heated in an oven to a temperature above the melting point of the powder coating and is then dipped into the fluidized bed. The powder coating particles contact the hot surface, then melt and flow on the substrate surface. See generally, Kirk-Othmer, *Concise Encyclopedia of Chemical Technology*, pp. 944–945 (1985).

One attempt to achieve a chrome-like finish has been through the incorporation of aluminum particles or aluminum flake into powder coating compositions. However, mere incorporation of aluminum flake into powder coating compositions has not produced a highly shiny, reflective chrome-like appearance, as measured by the high reflectance of conventional chrome electroplating, without special and additional processing techniques and additives.

Powder coating compositions and processes for the production of such powder compositions which can form a glossy, highly reflective metallic finish that appears to be as shiny as chrome plate are needed.

U.S. Pat. No. 5,045,114 describes a powder product that results from a process of preparing a powder coating material which can be applied to a substrate to form a coated article having a glossy, high reflective, metallic finish. The process comprises milling a resinous binder and about 1 to 12 parts of aluminum particles per 100 parts of binder, whereby the resinous binder and aluminum particles are milled and then separated from both milling media and oversized particle to produce a powder coating composition having a particle size between about 5 to 250 microns. Such powder coating materials, when applied and melt formed on a substrate surface, can exhibit high gloss, high reflectance and a metallic finish. The powder coating compositions can comprise (a) a resinous binder, (b) about 1 to about 12 parts of leafing aluminum particles per 100 parts of binder, and (c) an effective amount of a fluidizing agent per 100 parts of binder which are modified in accordance with the invention. The resinous binder and the aluminum particles are milled, and then separated from the milling media and oversized particles, to produce a powder coating material having a particle size between about 5.0 and about 250 microns. The aluminum flakes in all examples are provided as a paste of aluminum flakes in mineral spirits.

U. K. Patent No. 1,404,556 titled Particulate Coating Compositions and Coated Articles Prepared Therefrom describes a dry particulate composition comprising a fusible epoxy or acrylic resin and flake particles (selected from titanium nitride flake, nickel sulfide flake, cobalt sulfide flake and manganese sulfide flake), with the flakes embedded in the resin particles or affixed to their surface. Combination with aluminum flake, copper, bronze, brass, chromium and nickel flakes are also shown. The flakes and resin powder are mixed under shear conditions to reduce the size of the flake and to affix the flake to the resin. Pebble mills and any other type of high shear mixer is suggested. Examples show ball milling of the flake and resin particles (Example 1) and melting of the resin and particles in a roll mill (Example 2). A gloss over ninety is asserted to be the result of the process, with Example 2 showing a 20° gloss of 100.

U.S. Pat. No. 5,187,220 describes a thermosetting resin based coating powder containing metal flakes. The powder and flake are mixed at a temperature in the range above the softening temperature of the thermosetting resin, but below the melting temperature of the thermosetting resin, while the powder and flake composition is subjected to mechanical shear forces sufficient to prevent agglomeration of the coating powder particulates.

SUMMARY OF THE INVENTION

A method of manufacturing powder coating compositions, the powder coating compositions, and cured coatings made from the coating compositions are described. The method of preparing the coating compositions comprises combining a preformulated thermally or chemically softenable resin powder comprising a polymer having a defined glass transition temperature $T_g$ and a defined softening temperature $T_s$, and highly reflective particles, such as a non-leafing or leafing metallic flake, mica, optically variable pigments and the like, and mixtures thereof, and then mixing the powder and flake under high shear conditions and assuring that the average temperature of the mixture remains below, at or about $T_g$ of the polymer during the high speed mixing process. The temperature may be maintained at this temperature by repeatedly stopping (or slowing) the mixing (which would have low production efficiency, but would still produce an improved product) or by cooling the mixing equipment where the mixture is present. The process produces compositions which are more stable than compositions previously made by ball milling using aluminum flakes 'pasted' in solvent or plasticizer, e.g., mineral spirit, and provides coatings with a high degree of reflectivity. The process of the present invention can be used with pasted or non-pasted flakes and with polymer binder and may display an improved performance, at least over some ball milled non-pasted powder coating systems. The process may be summarized as a process for the manufacture of a powder coating material comprising the steps of:

providing as a mixing mass of both particulate polymer binder comprising a polymer having a $T_g$ and a $T_s$ and reflective particles within a container, mixing the mixing mass under high speed mixing conditions and controlling temperature in the mixing mass during mixing to keep the temperature of the mixing mass generally either below, at or about the $T_g$ of the polymer during mixing or below $T_g$ for a first period of time and then subsequently at or above $T_g$ for a second period of time (so that agglomeration of the polymer particles is minimized or prevented).

It should be noted that during the second period of time, the temperature might rise as high as $T_{mp}$, the melting temperature of the polymer.

The process of the present invention deagglomerates the reflective particles from each other and associates the reflective particles with the polymer particles, yet allows the process to be performed for extended periods of time to increase the gloss (reflectivity) of the coated product. The flakes or particles do not necessarily fuse (e.g., by melt-stick adhesion) to the polymer particles, but may only distribute themselves over the surface of the particles with surface tension, electrostatic or other physical attachment means. The result is a more or less uniform distribution of polymer and reflective particles. Fusion of the reflective particles to the polymer or resin particles (as with bonded powder coatings) may be subsequently effected as by a brief heating above $T_g$ or may occur to some degree with impact bonding. Depending on the results desired, such fusion or impact bonding may or may not be desired. The term association includes both this superficial physical attraction and attachment or contact and also includes actual melt stick adherence or impact fusion of the reflective particles to the polymer particles. There is a point where prolonged blending ceases to improve the gloss of the coating of the end product, or the amount of increase does not justify the costs, in terms of lower productivity, of additional blending. However, this point is only gradually reached and can be readily determined by routine experimentation.

A powder coating composition made by this process may comprise, for example, thermally or chemically softenable polymer particles having a number average diameter of between about 5 to 500 or 5 to 250 microns, preferably between about 15 to 60 microns, reflective particles, pigments and/or flakes ( leafing or non-leafing metallic flakes) having a number average maximum diameter of between about 4 and 45 microns, and preferably having less than 2% or less than 1% by weight of polymer of any liquid petroleum products. There is an expectation that the composition can be prepared having less than 5% by number of its reflective pigments, particles and/or flakes (e.g., leafing metallic flakes) agglomerated with other flakes, which agglomeration would reduce gloss. The composition may also include diluents, monomers, solvents or plasticizers. The composition may be alternatively described as a powder coating composition comprising thermally or chemically softenable polymer particles having a number average diameter of between about 15 and 60 microns, reflective pigments, particles and/or flakes (e.g., non-leafing or leafing metallic flakes) having a number average maximum diameter of between about 4 and 45 microns, and having less than about 2% or less than about 1% by weight of polymer of any liquid petroleum products, the powder when coated onto a surface in a continuous manner (e.g., at a thickness of at least about 5 microns or at least about 10 microns) and melted and cured, providing a reflectivity of about 100 up to above 400 at a 20 degree viewing angle.

The powder coating composition may be used in a process for providing a reflective surface on a substrate, the process comprising applying the powder coating composition onto the surface, melting the polymer in the powder coating composition, and hardening the polymer to form a coating having a gloss, at a 20 degree viewing angle, of greater than 100, and preferably greater than 250 and yet more preferably greater than about 400.

DETAILED DESCRIPTION OF THE INVENTION

The invention concerns a powder coating composition which comprises (a) a polymer binder, preferably a resinous polymer binder, (b) about 0.5 to 12 parts of reflective particles (for example reflective metal, preferably shiny metal, and most preferably shiny aluminum particles, mica, optically variable pigments, and the like) per 100 parts of binder, and (c) optionally an effective amount of a fluidizing agent per 100 parts of binder, whereby the resinous binder and reflective particles are blended at high shear mixing rates to produce a powder coating composition having a particle size between about 5 to about 60 microns (numerical average particle diameter for all particles).

The terminology referred to herein as "high shear" or "high speed" mixing can be related to many different factors within the process, and is not merely a function of tip speed and/or revolutions per minute, even though it is convenient and accurate to refer to those values in describing the high speed shearing and speed of the blades within the blender/mixer. During high shear mixing, the speed of the blade tip may be about 4,500 feet per minute. The high speed procedure actually can be further described with respect to the energy/time (power) which is being put into the mixture by blending and shearing forces (as opposed to, for example, direct heat energy). In selecting a blender and conditions of operation, there are at least three issues that should be considered in the manufacture of product. The blades should achieve a sufficient speed (usually measured by tip speed) to disperse the flakes (e.g., the aluminum flakes). This speed appears to be at least about 2,500–3,000 feet per minute, preferably at least above 3,000 feet per minute at the tip.

Two other considerations in the process are related to the energy transferred to the mixing mass. These two other considerations are the rate at which energy per unit of mixing mass is applied by the blender (which can be expressed as horsepower per pound of product) and a minimum work threshold, or total energy delivered per unit mass. As the horsepower per pound supplied by the blender is increased, the time in the blender needed to achieve the higher gloss values of the present invention decreases. A minimum amount of power and energy is applied to the product to achieve the high gloss levels. As the total amount of energy applied to the material over a fixed rate of time is increased (while keeping mixing mass temperature within the specified range), the amount of agglomeration is reduced and the gloss increases.

Any of a variety of blenders can be used in this process, including, the Welex™ (model no. TGAHK8), Mixaco™ (Model no. CM 3-12), Mixaco™ (Model no. CM-1000DB), and Bepex™ (Turbulizer TC-8). The blender employed is capable of providing a minimum power input to the mixing mass to insure uniform dispersion of particles and pigments. As the total energy added to the mixing mass increases under controlled temperature conditions, the gloss of the product increases (asymptotically to a finite limit).

The polymeric binder may be either thermoplastic or thermosetting. Generally, the binder is a material which will flow smoothly at elevated temperatures and which will then cure (thermoset) or solidify (thermoplastic) to a final, smooth, even, solid form. Cure may be initiated by the heating or by irradiation applied after or during coating of the powder.

The terms glass transition temperature $T_g$, softening point $T_s$, and melting point $T_{mp}$ are often used within the field of polymer chemistry and should be understood in considering the practice of the present invention. The term $T_g$ represents the glass transition temperature for the polymer. Usually when the term $T_g$ is used without any further description, it refers to the first order glass transition temperature. As polymers may comprise units of different properties (either randomly or precisely positioned within the polymer chain, as in graft or block copolymers), different segments may exhibit different glass transition temperatures. There might be a second order glass transition temperature or a third order glass transition temperature. At each order of the glass transition temperature, there is a relaxation of internal constraints on the polymer and it becomes more plastic (e.g., flowable by shear forces), softer or more pliable. The polymer has not reached a truly pliable state upon attaining $T_g$, and so it is not considered to have softened. It should be noted that the $T_g$ of the polymer in the mixture is affected by the presence of other components in the mixture. The term softening point (especially where differentiated from $T_g$) usually refers to a temperature significantly different from the first order $T_g$. Although not all manufacturers make separate references to the softening temperature $T_s$ and the $T_g$, where references are made, the softening point tends to be significantly higher than the $T_g$. For example, in the materials catalogue and product data sheets of EMS (e.g., for Grilesta V 76-14 Powder Coating Resin), the softening point of the polymer is more than 20° C. higher than the $T_g$ of the polymer. Other polymers display such differences with at least 10° C. or more of difference between the softening point and the glass transition temperature. This difference is readily understood in as much as the $T_g$ is determined by attainment of a specific viscosity which is not particularly flowable or soft, while the softening point measures a readily observed softening of the polymer, thereby requiring a higher temperature.

Thermoplastic resins, representative of those which might be used in the present invention, include vinyl homo- and copolymers, such as polyethylene, polypropylene, ethylene copolymers, e.g., polyethylene-$C_{3-8}$ olefin copolymers, polyvinyl chloride, metallocene based copolymers, polyvinylidene fluoride, ethylene-vinyl acetate, aromatic vinyls. e.g., polystyrene and styreneacrylonitrile resins; polyacrylics, such as polyacrylates and polymethacrylates, e.g., polymethylmethacrylate and polyethylmethacrylate; cellulosics, such as cellulose ethers and cellulose esters; polyesters, such as polynaphthalene terephthalate, poly (alkylene terephthalate), e.g., polyethylene terephthalate; polysiloxanes, polyurethane resins, and polyamides, such as nylon.

The thermosetting resins used in the present invention may be either addition reaction cure, or condensation reaction cure, thermosetting resins. A representative, and non-exclusive, listing of, thermosetting resins, applicable to the present invention, include epoxies such as diglycidyl ethers of bisphenol A and epoxy cresol/novalacs; phenolic resins, such as novolacs and resols; polyurethanes, such as polyester or acrylic resins with blocked isocyanate groups; saturated polyesters such as saturated terephthalic acid based polyesters and carboxylated polyesters; and acrylics based on crosslinkable acrylate resins such as carboxyl or hydroxyl functionalized resins, polysiloxanes and other silicon resins, selfcrosslinking etherified methoxylated resins based on acrylamides and/or methacrylamides. Polyester resins, such as those derived from isophthalic anhydride/glycol and trimellitic anhydride/glycol are also examples of useful materials.

Most of these thermosetting resins require the use of a curative to achieve a final crosslinked structure, but some of these, e.g., selfcrosslinking etherified methoxylated resins based on acrylamides and/or methacrylamides, will self-crosslink when subjected to elevated temperatures. Photo-initiation salts and compositions may also be provided to enable cure only upon irradiation. Such photoinitiators, for example, may include free radical initiators and the like. Examples of chemical classes of these photoinitiators include, but are not limited to arylonium salts (e.g., diaryl iodonium, triaryl sulfonium, phosphonium, diazonium), triazine, biimidazoles, benzophenones, benzoin ethers, and the like. The coupling of thermosetting resins and curative agents is well known to those skilled in the coatings art, and any such coupling can be used in the present invention which does not detrimentally affect the metallic finish of the present coating.

For purposes of calculating proportions of components in thermosetting systems, curatives are included in the term "binder". Diluents and inert fillers such as coating aids, flow control agents, other binders (e.g., thermoplastic binder mixed with the thermoset resins), dyes, pigments, antistatic agents, UV absorbers, UV stabilizers, antioxidants, catalysts, anionic or cationic initiators, acid releasing compounds, base releasing compounds, and the like may be present within the resin composition or the powder composition.

In the final, solid form, the resinous binder has a uniform content of reflective particles, such as metallic, e.g., bronze, gold, copper, brass, titanium, silver, or aluminum or metal-coated particles/metal coated films which are preferably introduced as leafing or non-leafing aluminum flakes. Leafing flakes such as leafing aluminum particles or flakes are coated with a material, e.g., stearic or palmitic acid, and when applied to a surface, the particles can orient in an interleaved structure parallel to the surface of the finished coating. This can result in a highly lustrous and reflective coating.

Aluminum flakes are preferably introduced at less than about 50 microns in diameter. The diameter, or more properly the maximum diameter of the metallic particles may have to be determined statistically as they tend to be high aspect ratio particles or flakes, with two major dimensions (width and length) and one minor dimension (thickness) which may be multiples or orders of magnitude smaller than the two major dimensions. When the dimension or diameter of the aluminum flakes are discussed, the maximum average diameter (e.g., either the maximum of width and length or the average of width and length, are referred to. The average width and length may be determined by statistical measurement of the surface area of the flakes, assuming the surface area to be provided by a circle, and "averaging" the width and length by determining what diameter would have provided that area to the flake.) More preferably, the aluminum flakes have a number average particle size of about 1 to about 45 microns, more preferably between 4 and 45 microns, and still more preferably between 5 and 40 microns. Most preferably, the aluminum flakes are sized such that 99.9% pass through 325 mesh screen, i.e., a diameter of less than about 45 microns, most preferably between 8 and 20 or between 10 and 17 microns.

As will be understood by those skilled in the art, the proportion of flakes and of binder in the mixture may be varied according to the specific characteristics of the component materials and of the substrate to which the mixture is to be applied. As a general rule, relatively low proportions of flake are desirable for a variety of reasons. Aluminum flake is relatively more expensive than binder and cost is thus reduced by employing a minimum of flake adequate to achieve coverage. Moreover, it has been found that lower levels of flake actually tend to impart higher gloss to the finished article. Therefore a flake loading of about 1% to about 2% by weight of polymer is most preferable. It should be noted, however that levels of flake loading up to about 15% might be effective in some compositions. In other compositions, flake loading as low as about 0.5% will give superior results. Preferably, the leafing aluminum flakes are introduced as a dry flake rather than the paste of aluminum and solvents having at least about 40 wt-% aluminum flake and more preferably about 60 to 70 wt-% aluminum flake described in U.S. Pat. No. 5,045,114. Preferably, the metal such as the aluminum is introduced in a quantity to provide about 1 to 15 parts of aluminum particles per 100 parts of polymer, binder or resin. This percentage may be considered with or without consideration of the leafing agent (e.g., the stearic acid) used on the flakes.

The use of solvents or viscous liquid carrying agents solvent should be avoided in compositions intended for dry application for a number of reasons. These types of agents promote agglomeration and instability in the powder compositions, and may detrimentally affect the other components of the powder coating composition. These undesirable solvents include petroleum-based solvents such as mineral spirits, petroleum spirits, petroleum benzin, petroleum ether, ligroin, refined solvent naptha or mixtures thereof. It may, however, be desirable to prepare a variant of the composition that includes diluents, monomers, solvents, or plasticizer, for use in alternative modes of application, such as liquid spray, pour-on, or brush-on modes.

In addition to the above, other constituents may be incorporated into the coating composition. Such constituents include flow control agents, scavengers, fluidizers, UV stabilizers, anti-oxidants and fillers. Flow control agents are known in the polymer art and are generally incorporated into the powdered coating composition to improve the flow of the polymer as it is melted to provide a smoother finish of the final solid coating. The fluidizer generally comprises inert particulates including inorganic oxide particles such as silica, alumina, zirconia or titania spheres. Fluidizer, if used, would be present as less than about 5% by weight of the polymer, preferably less than about 2% by weight of the polymer (binder), and more preferably less than about 1% by weight of the polymer.

The process of the present invention may be described as follows. Mix a powder coating formula containing polymer having a defined $T_g$ and a $T_s$ e.g., with particle sizes less than about 500 microns, preferably less than about 250 microns, more preferably less than about 100 microns and most preferably less than about 60 microns (e.g., 10 to 60 microns) or less than about 50 microns, such as between about 10 and 50 microns, between about 20 and 50 microns or between about 30 and 50 microns) with leafing metallic flakes, then blending the polymer and flakes as a mixing mass at high shear while maintaining the average temperature of the mixing mass generally below, at or about $T_g$ of the polymer. The temperature at which the mixing takes place may be either approximately constant over the mixing time, or may follow a predefined temperature profile, as a function of time or other process variable. In one embodiment, the temperature is maintained below $T_g$ for a first time period, and then allowed to rise above $T_g$ for a second time period. The first time period should be long enough to achieve effective deagglomeration of flakes. The duration of the second time period should be short enough to prevent re-agglomeration, or other harmful effects. As will be understood by one of skill in the art, the times and other process variables chosen will depend on the characteristics of the particular materials and mixing equipment. The temperature during the first time period may be maintained at least about 2 degrees C., at least about 5 degrees C., or more than about 10 degrees C. below $T_g$ of the polymer. The temperature during the second time period can be above $T_g$ up to about $T_{mp}$, but should be limited so as to minimize reagglomeration of flakes. Preferably, the temperature during the second time period will exceed $T_g$ by no more than 10% of the temperature span between $T_g$ and $T_s$. Still more preferably, the temperature during the second time period will exceed $T_g$ by no more than 5% of the temperature span between $T_g$ and $T_s$. As will be understood by one skilled in the art, the times and temperatures applied may vary according to the particular composition being treated and the results desired. During either time period, preventing the temperature of the mixing mass from rising much above the $T_g$ of the polymer for a prolonged time period has been found to provide beneficial effects and avoid harmful effects during the mixing operation. Such beneficial effects include dispersion of the reflective particles and increased reflectivity (gloss) in the cured film. Harmful effects would include melting of the polymer, sticking of the polymer and agglomeration of the reflective particles and polymer. It is particularly important to limit the time above $T_g$ so as to prevent excessive agglomeration. One commercial process blends resin powder and leafing aluminum flake at high shear speeds, allowing the mixing mass temperature to exceed the $T_s$ of the resin. At this high temperature, blending time is short and blending is terminated when significant agglomeration of the resin and flakes has begun. In the present invention, after the coating powder has been formed, the powder composition can be heated briefly (as by additional blending) or allowed to remain at an elevated temperature within the blending process to bond polymer to the aluminum flakes to assertedly reduce separation of the flake and binder and avoid disuniformity within the composition. It has been found in the practice of the present invention that sustaining high shear mixing approaching the $T_s$ during the first time period will cause significant agglomeration and (where thermal curative are present) could even cause some premature cure of the polymer, while entirely stopping the high speed shearing when $T_s$ is initially reached fails to deagglomerate all of the metal flakes. The failure to deagglomerate the flakes causes loss of reflective power and the possibility of irregularities in the coating because of the clumped particles.

In the present invention, by maintaining an average temperature for the mixing mass below or at or about the $T_g$ of the polymer, the high speed shearing may be continued longer without appreciable agglomeration, and the powder produces higher gloss as compared to compositions which use the same flakes and polymers, but allow the mixing mass temperature to significantly exceed $T_g$ or approach the $T_s$ of the polymer. The temperature of the mixing mass may be maintained below or just above $T_g$ of the polymer by stopping the high speed shear mixing intermittently to allow the temperature to decrease (or even removing the mixing mass entirely from the mixing bowl to a cooling environment), reducing the speed of mixing intermittently to moderate the temperature, or, most preferably, providing cooling mechanisms to the mixing mass container or environment so that the temperature of the mixing mass during high speed shear blending is maintained at a temperature below, at or about $T_g$ of the polymer. There are a number of physical effects and phenomena which exist in the polymer and the mixing procedure that can lead to preferences during this temperature control. Local heating may occur during the high speed shear mixing, especially around the shaft or fins, so that local temperatures which may be higher than the average mixing mass temperature may be significantly above the $T_g$ of the polymer. The effects of potential localized heating around the shaft may be minimized by providing a cooling mechanism to the shaft. With localized temperature control such as this, the average mixing mass temperature may be maintained closer to the $T_g$ of the polymer. The cooling can be done by air cooling, liquid cooling, electrical or electronic cooling (e.g., Peltier devices), or any other mechanism which can remove heat from the mixing mass during the high speed shear mixing procedure. Even chemical coolant reactions could be theoretically used, although it would be desirable to have as few extraneous materials as possible present in the resulting composition. As noted above, the use of petroleum products such as the mineral spirits adversely affects properties of the powder composition. Thus, powder compositions with less than about 5% by weight of liquid, distillate or viscous petroleum products are preferred, preferably less than about 2% or less than about 1% or less than about 0.5% by weight of the polymer, more preferably less than about 0.1% or less than about 0.01% of the polymer, and most preferably the powder compositions have no liquid or viscous petroleum products present.

A general preferred range for such ingredients would include 50–90% by weight polymer (preferably 70–86% by weight), 5–50% by weight crosslinking agent (preferably 14–30% by weight), 0 to 3% flow agent, preferably 0.3 to 3% by weight flow agent (more preferably 0.5 to 1.5% by weight flow agent), 0.2 to 4% degassing agent, preferably 0.2 to 2.0% degassing agent (more preferably 0.3 to 1.5% by weight), and 0.8 to 8% by weight leafing aluminum flake (preferably 0.8 to 6%, or 0.8 to 3% by weight).

The cured coatings of the present invention have been found to provide coatings with high gloss. In the practice of the present invention, dry powder coating compositions having 20° gloss levels over 400 have been obtained, as will be seen by reference to the examples attached herewithin. The powder coating compositions also exhibit reduced agglomeration as compared to compositions made by some other methods without using paste aluminum. For example, fewer than 8%, and preferably fewer than about 5% of the flakes are agglomerated with other flakes in the practice of the present invention. By non-agglomerated, with the leafing flakes of the present invention, it is meant that less than 15% of the surface area of a flake is adhered (not merely overlying the other flake, but actually bound thereto) to another flake, thereby masking its surface. An agglomerated flake therefore has at least 15% of its surface covered by another flake in an adhered manner, rather than merely lying on top of the flake. The Gloss values presented herein were measured on a BYK-Gardner gloss meter, which had been calibrated for white and black on calibration tiles specific for the gloss meter. Multiple readings were taken (and unless otherwise indicated, averages reported) with 3 readings for 3×5 aluminum panels. The procedure used was that indicated by the manufacturer in which the desired incident angle was selected by the appropriate button on the gloss meter, a statistic mode was selected, the sample platform was lowered, the statistic function was cleared, the sample was placed on the sample platform under a spotlight, the sample platform was raised, and the results were read.

As noted, the suppression of the temperature in the process may be effected by any convenient means. The most convenient means is the provision of cooling apparatus which surrounds the mixing area. Any conventional cooling system which is capable of controlling the temperature of the mixing mass during the high speed mixing is useful. The heat may be withdrawn from the container holding the mixing mass, the mixing mass directly, or by cooling the air or environment around the mixing mass. The process of the present invention, by selection of available commercial equipment, can be performed in either a batch or continuous process manner.

Those skilled in the art will appreciate the surprising nature of the disclosures made hereinabove. The ability to mix polymer powders with other particulate and flake media for long duration without agglomeration has the demonstrated utility of providing high gloss surface coatings by powder coating methods. Whereas, it was historically understood that higher temperatures were required to cause thermally induced adhesion between particles of polymer and pigment, the success of the present invention demonstrates that other physical phenomena, including electrostatic adhesion and uniformity of dispersion can provide similarly beneficial results. In fact the ultimate coatings are in many cases superior to those of the prior art, and these may be produced with higher equipment utilization in a more readily controlled process. It should be noted that once mixing at a temperature of below, at or about $T_g$ has achieved a desired uniformity of dispersion, it may be desirable to operate at a higher temperature (e.g., by adjustment or temperature controls), to cause additional adhesion between polymer and flake.

| BLENDER TYPE | RANGE, Horsepower-hours/pound |
|---|---|
| Welex ™ | 0.02–0.06 |
| Mixaco ™ | 0.02–0.10 |
| Bepex ™ | 0.05–0.10 |

The blender employed is capable of providing a minimum power input into the mixing mass to insure the uniform dispersion of particles and pigments. It is believed that at least 0.01 horsepower-hours/pound, preferably at least 0.02 horsepower-hours/pound, more preferably at least 0.04 or 0.05 horsepower-hours/pound, still more preferably at least 0.07 or at least 0.08 horsepower-hours/pound, and most preferably at least 0.09 or at least 0.10 horsepower-hours/ pound should be applied to the mixture of binder and flake while maintaining the temperature of the mixture mass below, at or about the $T_g$ of the polymer to gain the best benefits of the present invention. Of course, a limit to gloss will be attained, but values in excess of 800 and 900 have been achieved, as shown by the examples.

It is to be noted that the energy rates listed above are higher input rates than the natural heat loss rate of the blenders without modification. All blenders are run with external cooling means. In these experiments all blenders were run with coolant flowing through a jacket system, with the jacket surrounding the mixing chamber. Any other means of removing heat and cooling the mixing chamber are functional, of course. The mixture mass, usually through cooling of the mixing chamber or other areas of the blender could be performed by indirect or direct cooling with a jacket system. An indirect system could be a jacket or coil (e.g., or electronic Peltier system) on the outside of the mixing chamber, or a jacket or other cooling system within the mixing chamber (but insulated so that it would not react with the materials within the chamber). The cooling fluid could be a liquid or gas. Direct cooling would encompass such actions as the addition of inert components into the mixture mass within the blender. Heat would be removed by evaporation of the inert material. The use of cooled gas flows, liquid nitrogen, dry ice, and the like would be one way of effecting that process. Chilled air (not preferred because of the oxygen content) or relatively inert gases could be directed through the blending chamber to remove the heat generated.

The following examples evaluate the effects that variations in the blades within a single mixer may have on the gloss development while maintaining the temperature of the mixing mass below the $T_g$ of the polymer in the powder coating. A lab Mixaco batch blender was used in the examples.

| Time Minutes | 30° Blade Avg. Temp. °C. | 30° Blade 20° gloss | 45° Blade Avg. Temp. °C. | 45° Blade 20° gloss |
|---|---|---|---|---|
| 0 | 1 | 79 | 1 | 79 |
| 30 | 26 | 475 | 22 | 415 |
| 45 | 35 | 636 | 26 | 520 |
| 60 | 33 | 694 | 26 | 615 |
| 75 | 35 | 733 | 24 | 702 |
| 90 | 38 | 651 | 24 | 749 |

EXAMPLES

Background Study

The effects of varying shear rates, tip speeds (which have a relationship to work performed on the system), duration of the blending process, and the number of repetitions of the blending process were examined. A standard mixture of organics (the thermally curable resin) and leafing aluminum pigments were used in all of the evaluative examples. The resin selected and the leafing aluminum flake used were provided as a resin premix in all examples, unless otherwise indicated as:

78.9% by weight Polyester resin (isophthalic anhydride (IPA)/glycol; e.g., as manufactured by DSM, UCB, EMS or Ruco, Inc.) having a $T_g$ of about 53–57° C., 17.3% by weight E-caprolactam blocked isophorone diisocyanate, 1.2% by weight Acrylic flow agent, 0.8% by weight benzoin degassing agent, and 1.8% by weight leafing aluminum flake.

Volumes of the resin premix were placed into a laboratory Welex Blender (model no. TGAHK8), a specific blending speed selected (1,500; 2,000; 2,500; and 3,000 revolutions per minute [r.p.m.]), the resin premix was heated up by the energy of the blending action on the resin mass. Blending was stopped and the aluminum oxide fluidizer was added to the heated mass before the $T_g$ of the polymer in the powder coating was reached (a targeted temperature of about 48° C. was chosen), and the mixture was blended for an additional fifteen seconds to assure that the fluidizer was evenly distributed. The process is usually performed with the flakes and the resin already in the blender prior to initiation of the high shear mixing, at least for the purpose of convenience. The materials may be added to the blender as alternative layers in the blender prior to initiation of the blending. The powder mass was then dumped from the blender and subsequently used in a standard powder coating procedure at various coating thickness values, and data (including gloss at 20 and 60 degrees) taken.

Examples 1–4

The results are shown in TABLE 1 below.

Sample 1, 2,500 grams resin premix, 0.2% by weight aluminum oxide fluidizer, 1500 r.p.m., resin temperature of 48.2° C. upon addition of aluminum oxide fluidizer, and end temperature of 46.7° C.

Sample 2, 2,500 grams resin premix, 0.2% by weight aluminum oxide fluidizer, 2000 r.p.m., resin temperature of 48.2° C. upon addition of aluminum oxide fluidizer.

Sample 3, 2,500 grams resin premix, 0.2% by weight aluminum oxide fluidizer, 2500 r.p.m., resin temperature of 50.0° C. upon addition of aluminum oxide fluidizer.

Sample 4, 2,500 grams resin premix, 0.2% by weight aluminum oxide fluidizer, 3000 r.p.m.. resin temperature of 49.3° C. upon addition of aluminum oxide fluidizer.

TABLE 1

| SAMPLE | THICKNESS | ATI DOI | 20 GLOSS | 60° GLOSS |
|---|---|---|---|---|
| #1 | 2.5–3.2 mil | 41 | 191 | 247 |
| #2 | 2.6–2.8 mil | 36 | 189 | 243 |
| #3 | 2.8–3.3 mil | 42 | 206 | 260 |
| #4 | 2.8–3.6 mil | 37 | 195 | 248 |

DOI = Distinctness of Image (a measure of resolution of images upon reflection). Sample 1 was blended for 21.5 minutes, sample 2 for 8 minutes, sample 3 for 5 minutes, and sample 4 for 2.75 minutes.

The shear forces provided by the blending at 2,500 r.p.m. appeared to provide the best reflectance results on this composition in a single pass through the blender with the Temperature of the mixing mass maintained below the $T_g$ of the polymer in the powder coating.

Examples 5–10

The effects of repeated blending of the resin/flake mixture at 2,500 r.p.m. while maintaining the temperature of the mixing mass below the $T_g$ of the polymer in the powder coating was then examined. All of the samples were performed without the addition of fluidizing agent.

Sample 5 comprised the mixture with a single pass through the blender for 4.5 minutes at 2,500 r.p.m. with an endpoint temperature of 48.2° C.

Sample 6 took the end product of Sample 5 and performed a second blending operation for 5 minutes at 2,500 r.p.m. with an endpoint temperature of 48.0° C.

Sample 7 took the end product of Sample 6 and performed an additional blending operation for 4.5 minutes at 2,500 r.p.m. with an endpoint temperature of 48.0° C.

Sample 8 took the end product of Sample 7 and performed an additional blending operation for 4.5 minutes at 2,500 r.p.m. with an endpoint temperature of 48.2° C.

Sample 9 took the end product of Sample 8 and performed an additional blending operation for 4.5 minutes at 2,500 r.p.m. with an endpoint temperature of 49.2° C.

Sample 10 took the end product of Sample 9 and performed an additional blending operation for 4.0 minutes at 2,500 r.p.m. with an endpoint temperature of 48.1° C.

TABLE 2

| SAMPLE | THICKNESS | 20° GLOSS | 60° GLOSS |
| --- | --- | --- | --- |
| #5 | 4.0–4.8 mil | 228 | 332 |
| #6 | 4.3–4.9 mil | 280 | 376 |
| #7 | 3.0–3.3 mil | 321 | 400 |
| #8 | 2.2 mil | 378 | 431 |
| #9 | 4.2–4.6 mil | 422 | 444 |
| #10 | 4.6–4.9 mil | 483 | 475 |

Although there were some variations of gloss values within each sample dependent upon the thickness of the coatings (e.g., in Sample #3, a coating thickness of 2.8–3.3 mil provided 20° gloss of 206 and 60° gloss of 260), the clear trend of the data shows that increasing the amount of high shear blending (here by repetition of the blending operations) while maintaining the temperature of the mixing mass below the $T_g$ of the polymer in the powder coating improved the gloss.

A commercially available product produced by ball milling of wet (mineral spirits) aluminum flake in resin produced 3.0–3.4 mil coatings having 20° gloss of 555 and 60° gloss of 379. The coating, however, had a fairly grainy appearance.

Examples 11–34

The effects of cooling the blending equipment to moderate the temperature of the mixing mass so that the $T_g$ of the polymer in the powder coating was never exceeded, and the blending could be continued indefinitely was examined. 3750 g batches of resin (the same as used in Example 1) and leafing aluminum were premixed and used in each example. A sample of the powder was removed from the Mixaco™ blender at 10 minute intervals, sieved through a 140 mesh screen, sprayed through an Onoda™ electrostatic cup gun with the setting at 2 Barr pattern air/1 Barr flow air/60 kv, the powder being sprayed to a thickness of 2.0–4.0 mil and measured for gloss at 20 and 60 degrees (as the average of three readings), with the powder cured at 400° F. for fifteen minutes. Four different blade configurations were used in the examples, 1) a single straight blade (dispersion blade), 2) two straight blades (90 degree offset), 3) a single 30° bent blade, and 4) a single straight blade (dispersion blade) and a single bent blade in a ninety degree offset.

Single Straight Blade

TABLE 3

| SAMPLE | TIME (min.) | 20° GLOSS | 60° GLOSS |
| --- | --- | --- | --- |
| 11 | 10 | 238 | 302 |
| 12 | 20 | 307 | 348 |
| 13 | 30 | 383 | 382 |
| 14 | 40 | 418 | 407 |
| 15 | 50 | 465 | 428 |
| 16 | 60 | 507 | 449 |

Two Straight Blades

TABLE 4

| SAMPLE | TIME (min.) | 20° GLOSS | 60° GLOSS |
| --- | --- | --- | --- |
| 17 | 10 | 278 | 328 |
| 18 | 20 | 365 | 381 |
| 19 | 30 | 431 | 418 |
| 20 | 40 | 495 | 449 |
| 21 | 50 | 592 | 483 |
| 22 | 60 | 630 | 495 |

Single Bent Blade

TABLE 5

| SAMPLE | TIME (min.) | 20° GLOSS | 60° GLOSS |
| --- | --- | --- | --- |
| 23 | 10 | 482 | 436 |
| 24 | 20 | 655 | 503 |
| 25 | 30 | 742 | 528 |
| 26 | 40 | 807 | 549 |
| 27 | 50 | 827 | 553 |
| 28 | 60 | 856 | 564 |

Single Bent Blade and Single Straight Blade

TABLE 6

| SAMPLE | TIME (min.) | 20° GLOSS | 60° GLOSS |
| --- | --- | --- | --- |
| 29 | 10 | 432 | 417 |
| 30 | 20 | 553 | 479 |
| 31 | 30 | 691 | 508 |
| 32 | 40 | 764 | 534 |
| 33 | 50 | 787 | 544 |
| 34 | 60 | 817 | 547 |

The single bent blade composition was continued for 70, 80 and 90 minute intervals, and some marginal increase in gloss was found (e.g., maximum increase of 20 in 20° gloss, and maximum increase of 12 in 60° gloss.

A Hosokawa Bepex Turbulizer™ blender was also run at 4,000 r.p.m. and cooled for various samples, with similar results (e.g., 20° gloss range of 603–628 and 60° gloss range of 490–500). A single run at 4,200 r.p.m., without any attempt at optimization, also displayed reduced gloss from the best results at 2,500 to 4,000 r.p.m. (e.g., 20° gloss range of 379–389 and 60° gloss range of 397–402). This apparatus was run in a continuous operation with mix fed into one end and blended product removed at the other end.

Other efforts were made to attempt to evaluate controlling conditions on the provision of high gloss compositions from these materials. The same materials which provided a high gloss composition in the practice of the present invention with high shear mixing with temperatures maintained below the $T_g$ of the polymer in the powder coating would not produce gloss of similar quality when materials were first extruded, then ground in a conventional grinder with temperatures maintained below the $T_g$ of the polymer. For example, 20 degree gloss less than 100 was typically obtained.

Different reflective particles, such as manufactured by US Aluminum, Obron Atlantic and Toyal leafing flakes were used in high shear mixing processes. Resin particle compositions of both blocked polyurethane compositions and polyester/triglycidylisocyanurate were used with success.

Example 35

This Example evaluates the use of a pasted aluminum reflective particle (flake) in a high shear mixing process according to the practice of the present invention. A composition comprising 98.5% by weight of the same polymer resin particles used in Example 1 and 1.5% by weight of pasted aluminum flake was used in this example. A Welex blender (fully cooled by a water flow jacket) was used with 20 minutes at 2500 rpm, 30 minutes at 3000 rpm, 10 minutes at 3500 rpm, and 15 minutes at 4000 rpm. Samples were taken at different time intervals to evaluate the reflectivity at 20 and 60 degree gloss.

TABLE 7

| Sample No. | Time (min.) | 20° Gloss | 60° Gloss | R.P.M. |
|---|---|---|---|---|
| 1 | 5 | 244 | 313 | 2500 |
| 2 | 10 | 257 | 360 | 2500 |
| 3 | 15 | 253 | 368 | 2500 |
| 4 | 20 | 253 | 373 | 2500 |
| 5 | 25 | 281 | 381 | 3000 |
| 6 | 30 | 284 | 390 | 3000 |
| 7 | 35 | 297 | 395 | 3000 |
| 8 | 40 | NST | NST | 3000 |
| 9 | 45 | 305 | 399 | 3000 |
| 10 | 50 | NST | NST | 3000 |
| 11 | 55 | 328 | 410 | 3500 |
| 12 | 60 | 332 | 417 | 3500 |
| 13 | 65 | 376 | 427 | 4000 |
| 14 | 70 | 395 | 432 | 4000 |
| 15 | 75 | 433 | 444 | 4000 |

NST = No sample taken

As can be seen from these data, the gloss at 20 degrees increased most significantly with the pasted flake powder composition at the higher mixing speeds under cooled conditions. These pasted flake compositions were not optimized. Using 2.6% by weight pasted aluminum flake in a different curable resin composition with 50 minutes at a lower mixing rate (2500 rpm in the fully cooled Welex mixer) produced only a gloss of 99 at 20 degrees. Higher concentrations of pasted flakes seemed to provide higher gloss under similar mixing conditions.

The powder coating compositions with liquid petroleum products (e.g., from the pasted aluminum flakes) tend to be tacky and prone to agglomeration over time as compared to the non-pasted systems.

Additional Examples (36–44)

The effects of varying the bulk temperature of the mixture and the weight percent of leafing aluminum pigment in the mixture were examined. A standard mixture of organics (the thermally curable powder coating) and leafing aluminum pigments were used in all of the evaluative examples. The powder coating selected contained the following unless otherwise indicated:

65.8% by weight Polyester resin (isophthalic anhydride (IPA)/glycol; e.g., as manufactured by DSM, UCB, EMS or Ruco, Inc.) having a $T_g$ of about 53–57° C., 6.6% by weight E-caprolactam blocked isophorone diisocyanate, 3.2% by weight internally blocked isophorone diisocyanate 0.7% by weight Acrylic flow agent, 0.7% by weight benzoin degassing agent, 23.0% by weight barium sulfate, and The weight percent of leafing aluminum pigment was varied during the experiments. The amount is provided in each example.

Premix of powder coating and leafing aluminum pigment was placed into a laboratory Welex Blender (model no. TGAHK8) for each of the examples. The blender was loaded with 2500 grams of premix containing powder coating and leafing aluminum pigment. The blender was run at 2500 rpm for the time listed in each example. The resin premix was heated up by the energy of the blending action on the resin mass. The temperature of the mixing mass was controlled with cooling water through the jacket of the blending vessel. The temperature of the bulk powder was recorded and is provided in the examples.

A cooling system was required to maintain the temperature of the mixing either below, at or about the $T_g$ or between the $T_g$ and the $T_s$ in all examples. By controlling the temperature, the blend time for all samples is unlimited.

The process is usually performed with the flakes and the powder coating already in the blender prior to initiation of the high shear mixing, at least for the purpose of convenience. The materials may be added to the blender as alternative layers in the blender prior to initiation of the blending.

In each example, samples of the blended mixture were evaluated based on a standard powder coating procedure at various coating thickness values, and data (including gloss at 20 and 60 degrees) taken. Samples of the powder were sieved through a 140 mesh screen and sprayed through an Onoda™ electrostatic cup gun with the setting at 2 Barr pattern air/1 Barr flow air/60 kv. The powder was sprayed to a thickness of 2.0–4.0 mil and measured for gloss at 20 and 60 degrees (as the average of three readings) after the powder cured at 375° F. for ten minutes. The gloss data is provided with each example.

Example 36

This sample was prepared with the bulk temperature below the $T_g$ of the polymer in the powder coating. The leafing aluminum pigment content was 1.6% by weight. The blend time and bulk temperature are in Table 8:

TABLE 8

| Time, min | Temperature, ° C. | Time, min | Temperature, ° C. |
|---|---|---|---|
| 0 | 25.2 | 21 | 41.7 |
| 1 | 32.9 | 22 | 36.6 |
| 2 | 39.2 | 23 | 36.7 |
| 3 | 39.2 | 24 | 38.4 |
| 4 | 38 | 25 | 40.5 |
| 5 | 39 | 26 | 41.3 |
| 6 | 40.3 | 27 | 40.8 |
| 7 | 39.1 | 28 | 37.3 |
| 8 | 37.9 | 29 | 35.9 |
| 9 | 37 | 30 | 36.9 |
| 10 | 37.8 | 31 | 39.1 |

TABLE 8-continued

| Time, min | Temperature, °C. | Time, min | Temperature, °C. |
|---|---|---|---|
| 11 | 39.3 | 32 | 40.8 |
| 12 | 40.4 | 33 | 39.1 |
| 13 | 38.9 | 34 | 39.6 |
| 14 | 38.4 | 35 | 41.1 |
| 15 | 39.3 | 36 | 39.1 |
| 16 | 41.1 | 37 | 36.6 |
| 17 | 39.6 | 38 | 36.4 |
| 18 | 37.9 | 39 | 38.1 |
| 19 | 38.6 | 40 | 39.3 |
| 20 | 40.2 | | |

Table 9 contains the gloss values for a sample of powder coating removed at the end of the blend cycle. The powder was applied, cured and evaluated at standard conditions.

TABLE 9

| Panel | Film Thickness, mils | 20° Gloss | 60° Gloss |
|---|---|---|---|
| 1 | 1.9–2.0 | 501 | 416 |
| 2 | 2.2–2.4 | 490 | 417 |
| 3 | 2.0–2.6 | 506 | 422 |
| 4 | 2.4–2.7 | 475 | 403 |

Example 37

A sample was prepared with the bulk temperature above the $T_g$ and below the $T_s$ of the polymer in the powder coating. Part of the blend cycle was done below the $T_g$ of the polymer. This resulted from allowing the energy from mixing to increase the bulk temperature. The bulk temperature of the mixture was controlled slightly above the $T_g$ of the polymer in the powder coating. The leafing aluminum pigment content was 1.6% by weight. The blend time and bulk temperature are in Table 10:

TABLE 10

| Time, min | Temperature, °C. | Time, min | Temperature, °C. |
|---|---|---|---|
| 0 | 22.5 | 21 | 59.2 |
| 1 | 30.7 | 22 | 61.1 |
| 2 | 36.4 | 23 | 59.3 |
| 3 | 40 | 24 | 58.2 |
| 4 | 43 | 25 | 58 |
| 5 | 45.2 | 26 | 59.3 |
| 6 | 47.5 | 27 | 60.4 |
| 7 | 49.7 | 28 | 57 |
| 8 | 52 | 29 | 56.2 |
| 9 | 54 | 30 | 57.1 |
| 10 | 55.8 | 31 | 58.8 |
| 11 | 57.7 | 32 | 60 |
| 12 | 59.9 | 33 | 58 |
| 13 | 56.8 | 34 | 58.4 |
| 14 | 50.2 | 35 | 59.5 |
| 15 | 48.9 | 36 | 59.2 |
| 16 | 50 | 37 | 58.8 |
| 17 | 51.8 | 38 | 59.9 |
| 18 | 53.3 | 39 | 57.6 |
| 19 | 55.3 | 40 | 57.7 |
| 20 | 57.2 | | |

Table 11 contains the gloss values for a sample of powder coating removed at the end of the blend cycle. The powder was applied, cured and evaluated at standard conditions.

TABLE 11

| Panel | Film Thickness, mils | 20° Gloss | 60° Gloss |
|---|---|---|---|
| 1 | 2.2–2.6 | 434 | 394 |
| 2 | 2.2–2.5 | 436 | 394 |
| 3 | 2.2–2.6 | 441 | 396 |
| 4 | 2.6–2.8 | 438 | 397 |

Example 38

An attempt was made to prepare a sample with the bulk temperature above the $T_g$ and approaching the $T_s$ of polymer in the powder coating. For this example, the powder coating was blended at 2500 rpm without the leafing aluminum pigment present until the temperature reached 60° C. At this point the leafing aluminum pigment was added to the blender at 1.6% by weight pigment. The bulk temperature of the mixture was allowed to increase. The blend time and temperature data is in Table 12:

TABLE 12

| Time, min | Temperature, °C. |
|---|---|
| 0 | 49.6 |
| 1 | 51.2 |
| 2 | 53.7 |
| 3 | 56 |
| 4 | 57.9 |
| 5 | 58.7 |
| 6 | 61.4 |
| 7 | 63 |
| 8 | 64.9 |
| 9 | 66.6 |
| 10 | 68.3 |
| 11 | 69.5 |
| 12 | 70.5 |
| 13 | 70.3 |

After 13 minutes of blending, the blender was stopped and opened. The powder coating mixture in the blender had begun to agglomerate. The agglomeration was significant enough to prevent application and evaluation of this powder on panels.

Example 39

A sample was prepared with the bulk temperature below the $T_g$ of the polymer in the powder coating. The leafing aluminum pigment content was 3.5% by weight. The blend time and bulk temperature are in Table 13:

TABLE 13

| Time, min | Temperature, °C. | Time, min | Temperature, °C. |
|---|---|---|---|
| 0 | 19.9 | 21 | 19.6 |
| 1 | 11.9 | 22 | 19.5 |
| 2 | 12.1 | 23 | 20 |
| 3 | 14.1 | 24 | 20.1 |
| 4 | 15.3 | 25 | 20.5 |
| 5 | 16 | 26 | 21.2 |
| 6 | 16.3 | 27 | 21.4 |
| 7 | 16.5 | 28 | 21.5 |
| 8 | 16.3 | 29 | 21.8 |
| 9 | 16.5 | 30 | 21.5 |
| 10 | 16.8 | 31 | 21.4 |
| 11 | 16.8 | 32 | 21.4 |
| 12 | 16.8 | 33 | 21.4 |
| 13 | 16.9 | 34 | 21.2 |
| 14 | 17.6 | 35 | 21 |

TABLE 13-continued

| Time, min | Temperature, °C. | Time, min | Temperature, °C. |
|---|---|---|---|
| 15 | 17.5 | 36 | 21 |
| 16 | 17.9 | 37 | 20.8 |
| 17 | 18.1 | 38 | 21 |
| 18 | 18.3 | 39 | 21.3 |
| 19 | 19 | 40 | 21.2 |
| 20 | 19.2 | | |

Table 14 contains the gloss values for a sample of powder coating removed at the end of the blend cycle for Example 6. The powder was applied, cured and evaluated at standard conditions.

TABLE 14

| Film Thickness for 4 panels, mils | Average of four panels 20° Gloss | Average of four panels 60° Gloss |
|---|---|---|
| 2.0–3.5 | 153 | 297 |

Example 40

A sample was prepared with the bulk temperature above the $T_g$ and below the $T_s$ of the polymer in the powder coating. The leafing aluminum pigment content was 3.5% by weight. The blend time and bulk temperature are in Table 15:

TABLE 15

| Time, min | Temperature, °C. | Time, min | Temperature, °C. |
|---|---|---|---|
| 0 | 16.8 | 21 | 50 |
| 1 | 21.8 | 22 | 46.9 |
| 2 | 26 | 23 | 47.2 |
| 3 | 29 | 24 | 48.4 |
| 4 | 31.1 | 25 | 50 |
| 5 | 33.3 | 26 | 51.7 |
| 6 | 35.6 | 27 | 53.4 |
| 7 | 37.2 | 28 | 55.2 |
| 8 | 39.2 | 29 | 56.7 |
| 9 | 41.4 | 30 | 58.7 |
| 10 | 43.1 | 31 | 60.1 |
| 11 | 44.5 | 32 | 56.8 |
| 12 | 6.4 | 33 | 55.1 |
| 13 | 48.2 | 34 | 56.4 |
| 14 | 49.8 | 35 | 57.5 |
| 15 | 51.1 | 36 | 58.8 |
| 16 | 52.9 | 37 | 60 |
| 17 | 54.7 | 38 | 55.5 |
| 18 | 56.8 | 39 | 55 |
| 19 | 58.6 | 40 | 56.1 |
| 20 | 60 | | |

Table 16 contains the gloss values for a sample of powder coating removed at the end of the blend cycle for Example 7. The powder was applied, cured and evaluated at standard conditions.

TABLE 16

| Film Thickness for 4 panels, mils | Average of 4 panels, 20° Gloss | Average of 4 panels, 60° Gloss |
|---|---|---|
| 2.0–3.3 | 107 | 259 |

Example 41

A sample was prepared with the bulk temperature slightly above $T_g$ of the polymer in the powder coating. This material was run for an extended period. The blender was stopped and sampled at 10 minutes, 30 minutes, 50 minutes, 65 minutes, and 75 minutes. The leafing aluminum pigment content was 1.6% by weight. The blend time and bulk temperature are in Table 17:

TABLE 17

| Time, min | Temp. °C. | Time, min | Temp. °C. |
|---|---|---|---|
| 0 | 17.8 | 38 | 56.6 |
| 1 | 24 | 39 | 57.3 |
| 2 | 28.8 | 40 | 58.5 |
| 3 | 32.2 | 41 | 59.6 |
| 4 | 34.9 | 42 | 58.2 |
| 5 | 37 | 43 | 56.3 |
| 6 | 39 | 44 | 55.8 |
| 7 | 40.8 | 45 | 56.4 |
| 8 | 42.5 | 46 | 57.4 |
| 9 | 44.3 | 47 | 58.5 |
| 10 | 46 | 48 | 59.6 |
| 11 | 45.2 | 49 | 59.3 |
| 12 | 47.4 | 50 | 58.3 |
| 13 | 49.3 | 51 | 55.7 |
| 14 | 51 | 52 | 57.2 |
| 15 | 52.4 | 53 | 58.7 |
| 16 | 53.6 | 54 | 60 |
| 17 | 55.3 | 55 | 59.7 |
| 18 | 56.9 | 56 | 58.5 |
| 19 | 59 | 57 | 57.8 |
| 20 | 59.3 | 58 | 57.7 |
| 21 | 58.4 | 59 | 58.2 |
| 22 | 59 | 60 | 58.9 |
| 23 | 57.8 | 61 | 59.2 |
| 24 | 55.4 | 62 | 59.2 |
| 25 | 55.1 | 63 | 58.3 |
| 26 | 55.7 | 64 | 57.7 |
| 27 | 56.8 | 65 | 57.6 |
| 28 | 58.1 | 66 | 55.4 |
| 29 | 59.4 | 67 | 57.1 |
| 30 | 57.9 | 68 | 58.6 |
| 31 | 54.1 | 69 | 59.8 |
| 32 | 55 | 70 | 58.7 |
| 33 | 56.2 | 71 | 56.8 |
| 34 | 57.8 | 72 | 56 |
| 35 | 59.4 | 73 | 56.1 |
| 36 | 58.5 | 74 | 56.8 |
| 37 | 56.7 | 75 | 57.5 |

Table 18 contains the gloss values for samples of powder coating removed at different times in the blend cycle for Example 8. The powder was applied, cured and evaluated at standard conditions.

TABLE 18

| Blend Time, Minutes | Average 20° Gloss | Average 60° Gloss |
|---|---|---|
| 10 | 352 | 375 |
| 30 | 424 | 439 |
| 50 | 326 | 417 |
| 65 | 326 | 412 |
| 75 | 285 | 394 |

Example 42

A sample was prepared with the bulk temperature at the $T_g$ of the polymer in the powder coating. This material was run for an extended period. The blender was stopped and sampled at 10 minutes, 30 minutes, 50 minutes, 65 minutes, and 75 minutes. The leafing aluminum pigment content was 1.6% by weight. The blend time and bulk temperature are in Table 19:

TABLE 19

| Time, min | Temp. °C. | Time, min | Temp. °C. |
|---|---|---|---|
| 0 | 21.3 | 38 | 53.1 |
| 1 | 27.0 | 39 | 53.3 |
| 2 | 31.9 | 40 | 54.4 |
| 3 | 35.3 | 41 | 56.1 |
| 4 | 37.7 | 42 | 55.0 |
| 5 | 39.7 | 43 | 53.5 |
| 6 | 41.6 | 44 | 53.8 |
| 7 | 43.6 | 45 | 55.1 |
| 8 | 45.2 | 46 | 56.6 |
| 9 | 47.4 | 47 | 54.8 |
| 10 | 49.1 | 48 | 54.7 |
| 11 | 49.0 | 49 | 55.5 |
| 12 | 51.0 | 50 | 57.1 |
| 13 | 52.8 | 51 | 56.5 |
| 14 | 54.3 | 52 | 53.7 |
| 15 | 56.3 | 53 | 52.8 |
| 16 | 56.1 | 54 | 53.1 |
| 17 | 55.7 | 55 | 54.1 |
| 18 | 56.1 | 56 | 55.8 |
| 19 | 55.4 | 57 | 56.1 |
| 20 | 56.4 | 58 | 53.3 |
| 21 | 55.4 | 59 | 52.9 |
| 22 | 55.0 | 60 | 53.5 |
| 23 | 55.8 | 61 | 54.5 |
| 24 | 54.6 | 62 | 55.8 |
| 25 | 53.8 | 63 | 56.3 |
| 26 | 54.5 | 64 | 53.5 |
| 27 | 55.9 | 65 | 53.0 |
| 28 | 55.0 | 66 | 52.2 |
| 29 | 53.8 | 67 | 53.8 |
| 30 | 54.6 | 68 | 55.5 |
| 31 | 54.3 | 69 | 56.9 |
| 32 | 56.2 | 70 | 54.4 |
| 33 | 55.4 | 71 | 53.4 |
| 34 | 54.5 | 72 | 53.9 |
| 35 | 55.0 | 73 | 55.1 |
| 36 | 56.0 | 74 | 56.2 |
| 37 | 54.8 | 75 | 55.1 |

Table 20 contains the gloss values for samples of powder coating removed at different times in the blend cycle for Example 7. The powder was applied, cured and evaluated at standard conditions.

TABLE 20

| Blend Time, Minutes | Average 20° Gloss | Average 60° Gloss |
|---|---|---|
| 10 | 351 | 315 |
| 30 | 380 | 414 |
| 50 | 408 | 442 |
| 65 | 416 | 457 |
| 75 | 410 | 449 |

Example 43

A sample was prepared with the bulk temperature below the $T_g$ of the polymer in the powder coating. This material was run for an extended period. The blender was stopped and sampled at 10 minutes, 30 minutes, 50 minutes, and 60 minutes. The leafing aluminum pigment content was 1.6% by weight. The blend time and bulk temperature are in Table 21:

TABLE 21

| Time, Min | Temp. °C. | Time, Min | Temp. °C. |
|---|---|---|---|
| 0 | 21.9 | 31 | 23.4 |
| 1 | 29.0 | 32 | 23.8 |
| 2 | 28.8 | 33 | 24.3 |
| 3 | 27.8 | 34 | 24.2 |
| 4 | 26.9 | 35 | 24.6 |
| 5 | 26.5 | 36 | 24.5 |
| 6 | 26.3 | 37 | 24.6 |
| 7 | 25.9 | 38 | 24.5 |
| 8 | 25.9 | 39 | 25.8 |
| 9 | 25.8 | 40 | 25.4 |
| 10 | 25.7 | 41 | 25.2 |
| 11 | 24.3 | 42 | 25.1 |
| 12 | 24.3 | 43 | 24.1 |
| 13 | 24.5 | 44 | 23.9 |
| 14 | 24.4 | 45 | 23.5 |
| 15 | 24.4 | 46 | 23.5 |
| 16 | 24.5 | 47 | 23.7 |
| 17 | 24.4 | 48 | 23.5 |
| 18 | 24.5 | 49 | 23.6 |
| 19 | 24.5 | 50 | 23.7 |
| 20 | 24.5 | 51 | 22.6 |
| 21 | 24.3 | 52 | 22 |
| 22 | 24.1 | 53 | 23 |
| 23 | 24.2 | 54 | 23.2 |
| 24 | 24.3 | 55 | 23.4 |
| 25 | 25.4 | 56 | 23.4 |
| 26 | 24.7 | 57 | 23.8 |
| 27 | 24.4 | 58 | 23.8 |
| 28 | 24.0 | 59 | 23.9 |
| 29 | 24.2 | 60 | 24 |
| 30 | 24.4 | | |

Table 22 contains the gloss values for samples of powder coating removed at different times in the blend cycle for Example 8. The powder was applied, cured and evaluated at standard conditions.

TABLE 22

| Blend Time, Minutes | Average of 4 panels, 20° Gloss | Average of 4 panels, 60° Gloss |
|---|---|---|
| 10 | 323 | 354 |
| 30 | 569 | 485 |
| 50 | 687 | 526 |
| 60 | 723 | 536 |

Example 44

A sample was prepared with the bulk temperature below the $T_g$ of the polymer in the powder coating for the initial 30 minute of blending. The cooling system was then shut off. Blending was continued and the temperature allowed to rise to the $T_g$. A sample was removed when the temperature reached the $T_g$ at 41 minutes. The blender was then restarted and the temperature was controlled slightly above the $T_g$ for 6 minutes. A sample was then pulled at a total blend time of 47 minutes. The leafing aluminum pigment content was 1.6% by weight. The blend time and bulk temperature are in Table 23:

TABLE 23

| Mix Time Minutes | Temp °C. | Mix Time Minutes | Temp °C. |
|---|---|---|---|
| 0 | 23.8 | 24 | 23.8 |
| 1 | 27.6 | 25 | 24.0 |

TABLE 23-continued

| Mix Time Minutes | Temp ° C. | Mix Time Minutes | Temp ° C. |
|---|---|---|---|
| 2 | 28.0 | 26 | 23.9 |
| 3 | 27.1 | 27 | 23.9 |
| 4 | 26.4 | 28 | 23.8 |
| 5 | 25.9 | 29 | 23.9 |
| 6 | 25.8 | 30 | 24.2 |
| 7 | 25.8 | 31 | 24.9 |
| 8 | 25.3 | 32 | 29.8 |
| 9 | 25.0 | 33 | 34.5 |
| 10 | 25.2 | 34 | 38.3 |
| 11 | 23.7 | 35 | 42.1 |
| 12 | 23.7 | 36 | 45.3 |
| 13 | 23.9 | 37 | 48.6 |
| 14 | 23.6 | 38 | 51.2 |
| 15 | 23.7 | 39 | 54.2 |
| 16 | 23.7 | 40 | 55.8 |
| 17 | 23.5 | 41 | 57.2 |
| 18 | 23.7 | 42 | 56.6 |
| 19 | 23.7 | 43 | 55.4 |
| 20 | 23.7 | 44 | 57.0 |
| 21 | 23.5 | 45 | 59.0 |
| 22 | 23.8 | 46 | 58.0 |
| 23 | 23.9 | 47 | 58.7 |

Table 24 contains the gloss values for samples of powder coating removed at different times in the blend cycle for Example 9. The powder was applied, cured and evaluated at standard conditions.

TABLE 24

| Blend Time, Minutes | Average of 4 panels, 20 ° Gloss | Average of 4 panels, 60 ° Gloss |
|---|---|---|
| 10 | 312 | 354 |
| 30 | 564 | 484 |
| 41 | 669 | 524 |
| 47 | 659 | 522 |

What we claim:

1. A process for the manufacture of a powder coating material comprising the steps of:
providing reflective particles and particulate binder comprising a polymer having a $T_g$ and a $T_s$ and a temperature span therebetween as a mixing mass within a container, mixing said mixing mass, and controlling the temperature of said mixing mass to maintain the temperature of said mixing mass at about a first temperature for a first time period, and at about a second temperature for a second time period, said first temperature being below $T_g$ and said second temperature being at or above $T_g$, so as to produce a powder coating material that, when coated onto a surface, provides a 20° gloss measurement of at least 189.

2. A process as defined in claim 1 wherein said mixing is performed in a mixer having at least one blade with a tip, wherein the speed of said blade tip is at least about 4,500 feet/min.

3. A process as defined in claim 1 wherein said reflective particles comprise leafing metallic flakes.

4. A process as defined in claim 3 wherein said flakes comprise less than about 4% by weight of said binder.

5. A process for the manufacture of a powder coating material comprising the steps of:
providing, as a mixing mass within a container, particulate binder comprising a polymer having a $T_g$ and a $T_s$ and a temperature span therebetween and reflective particles, mixing said mixing mass, and controlling the temperature of said mixing mass to maintain the temperature of said mixing mass within about 10% of said temperature span above said $T_g$ during said mixing, so as to produce a powder coating material that when coated onto a surface, provides a 20° gloss measurement of at least 189 wherein said reflective flakes are present from about 0.5 parts to about 12 parts per 100 parts of said binder.

6. The process of claim 5 wherein sufficient heat is removed from said mixing mass during said mixing that the average temperature of the mixing mass remains more than 2° C. below said $T_g$ of the polymer in powder coating during said mixing.

7. The process of claim 5 wherein sufficient heat is removed from said mixing mass during said mixing that the average temperature of the mixing mass remains more than 5° C. below said $T_g$ of the polymer in powder coating during said mixing.

8. The process of claim 5 wherein said mixing is performed with blades in a mixer, and the speed of the blades at its tips are at least 4,500 feet/min.

9. The process of claim 5 wherein sufficient heat is removed from said mixing mass during said mixing by means comprising a step selected from the group consisting of cooling of a mixing container and stopping said mixing.

10. A process as defined in claim 5 wherein sufficient heat is removed from said mixing mass during said mixing to maintain an average temperature of said mixing mass at a temperature selected from the group consisting of above Tg, at or about Tg and combinations thereof.

11. A process as defined in claim 5 wherein sufficient heat is removed from said mixing mass during said mixing to maintain an average temperature of said mixing mass within about 1% of said temperature span above $T_g$.

* * * * *